United States Patent Office 3,539,638
Patented Nov. 10, 1970

3,539,638
VULCANIZATION PROCESS USING THIAZOLES AND MIXTURES OF UNSYMMETRICAL THIURAM DISULFIDES
Gustav Christian Maassen, Wilton, Conn., assignor to R. T. Vanderbilt Company, Inc., New York, N.Y., a corporation of New York
No Drawing. Filed Jan. 15, 1968, Ser. No. 697,641
Int. Cl. C08f 27/06
U.S. Cl. 260—79.5                                   8 Claims

ABSTRACT OF THE DISCLOSURE

A process for vulcanizing ethylene-propylene-diene terpolymer rubbers having a mixture of symmetrical tetraalkylthiuram disulfides and thiazoles to eliminate accelerator bloom.

---

In the past, ethylene-propylene-diene terpolymer rubbers, designated by the ASTM as EPDM rubbers, have been vulcanized by employing sulfur, 2-mercaptobenzothiazole and tetramethylthiuram monosulfide. However, unsightly white accelerator bloom develops on black stocks within a few days after this vulcanization.

Accelerator blooming is an art-recognized phenomenon. The exact nature of the phenomenon is not understood, but it is known to relate to the formation, during sulfur vulcanization, of powdery white zinc dialkyldithiocarbamate from the thiuram sulfide, sulfur and zinc oxide therein.

If symmetrical tetraalkylthiuram monosulfide is used in low amounts (1.5 phr.) without a thiazole in the sulfur vulcanization of EPDM rubber, it was found that there was little if any accelerator bloom but the rate and state of cure is not as high as might be desired. If, however, symmetrical tetraalkylthiuram monosulfide was used in high amounts (3 phr.) without a thiazole, it was found that there was a desirable high rate and state of cure but there was heavy accelerator bloom.

It has now been discovered that an EPDM rubber vulcanizate can be formed which has a desirable high rate and state of cure, i.e., high modulus and tensile strength, and which is substantially free from accelerator bloom. Thus, in accordance with one embodiment of the invention, EPDM rubber is cured in the presence of sulfur, a thiazole and a mixture of symmetrical tetraalkylthiuram disulfides.

Ethylene-propylene - diene terpolymer (EPDM) rubbers are well known in the art [Waddell et al., Properties of a New Unsaturated Ethylene-Propylene Elastomer, Rubber Age, vol. 94, No. 3, p. 427 (December 1963); Cornell et al. Dimethacrylate Monomer Cure of EPDM: Effect of Unsaturation, Rubber World, 151 (1), p. 66 (April 1965)]. The EPDM rubber is made from three monomers, i.e., ethylene, propylene and a non-conjugated diene. The EPDM rubber has a saturated carbon-to-carbon backbone with unsaturation in the sidechains. The molecules are flexible polyethylene chains having methyl groups (from the propylene monomer) attached at frequent intervals and pendant unsaturated hydrocarbon groups (from the particular diene monomer) at less frequent intervals. The diene monomers for copolymerization with ethylene and propylene may be straight chain or ring compounds, usually non-conjugated. These monomers include, among others, the following: cyclopentadiene, alkylcyclopentadiene, dicyclopentadiene, 1,4-hexadiene, 1,5-hexadiene, 1,5 - pentadiene, 1,9-decadiene, 1,5-cyclooctadiene, 11-ethyl-1,11-tridecadiene, trivinylmonocycloalkane, 4,7,8,9-tetrahydroindane, and 5-methylene-2-norbornene. The quantity of diene monomer is generally from about 0.5 to 10 mole percent, but about 3 to 5 mole percent is preferred.

The symmetrical tetraalkylthiuram disulfides employed herein have the generic structure as follows:

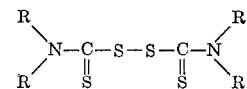

wherein each R is the same alkyl group having 1 to 6 carbon atoms. This includes, among others, the following compounds: tetramethylthiuram disulfide, tetraethylthiuram disulfide, tetrapropylthiuram disulfide and tetrabutylthiuram disulfide. These sulfides may be prepared by any suitable method. In the present invention, it is necessary to use a mixture of two different tetraalkylthiuram disulfides. Usually, the mixture contains 30 to 70 parts of a first tetraalkylthiuram disulfide and 70 to 30 parts of a second tetraalkylthiuram disulfide. A preferred mixture contains a 50:50 mixture of tetramethylthiuram disulfide and tetraethylthiuram disulfide.

The EPDM rubber in this invention is cured in the presence of sulfur and a thiazole accelerator in combination with the aforementioned mixture of symmetrical tetraalkylthiuram disulfides. The thiazole accelerators are well known in the art (U.S. Pat. No. 2,850,553). Preferred thiazoles have the following generic structure:

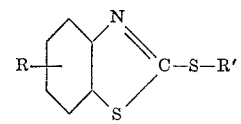

in which R is hydrogen, chlorine, lower alkyl, lower alkoxy or nitro and R' is hydrogen, a divalent metal such as zinc or lead, 2-thiobenzothiazolyl or —NR"R'" in which R" and R'" are independently selected from hydrogen, lower alkyl, cycloalkyl, phenyl or substituted phenyl, or are combined through —CH$_2$—, N, or —O— to form heterocyclic radicals, to give the 2-benzothiazole sulfenamides. Especially preferred thiazoles are 2-mercaptobenzothiazole, benzothiazolyl disulfide, N-cyclohexylbenzenethiazole-2-sulfenamide, N-dioxydiethylene-benzothiazole-2-sulfenamide, zinc 2-benzothiazolyl sulfide and mixtures thereof.

The proportions of the compounds in the curing system may vary over a wide range. The range of the mixture of symmetrical tetraalkylthiuram disulfides is generally about 0.5 to 5.0 phr., preferably 1.0 to 3.0 phr. The range of thiazole accelerator is generally about 0.25 to 3.0 phr., preferably 1.0 to 1.5 phr. The range of sulfur is generally about 0.5 to 5.0 phr., preferably 1.0 to 2.0 phr. The curing system also usually contains about 1.0 to 25 phr., preferably 2.0 to 5.0 phr. of zinc oxide.

Other ingredients may be included in the system for curing the EPDM rubber. The following optional ingredients, among others, are applicable: antioxidants, antiozonants, flex cracking agents, fillers, pigments, extenders, lubricants, plasticizers, tackifiers and colorants. Use of these ingredients is well known in the art.

Any suitable curing procedure and conditions may be employed in the present invention such as steam curing and air curing. Preferably, the compounded rubber is press cured at a temperature between 280° F. and 345° F. for 10 to 120 minutes.

Thus, in accordance with this invention, an ethylene-propylene-diene terpolymer rubber (EPM rubber) has been cured to provide accelerator bloom-free vulcanizate with a high rate and state of cure. In other words, a vulcanizate of the invention has high modulus and tensile strength without accelerator bloom.

The following examples are submitted to illustrate but not to limit this invention. Unless otherwise indicated, all parts and percentages in the specification and claims are based upon weight.

EXAMPLE I

Vulcanizates A, B and C were provided by compounding ethylene-propylene-diene monomer rubber samples (Nordel 1070 rubber) with various disulfides (see Table 2) and with other ingredients in Table 1 herebelow:

TABLE 1

| Ingredients: | Parts by weight |
|---|---|
| EDPM rubber [a] | 100 |
| Stearic acid | 1 |
| Zinc oxide | 5 |
| Agerite resin D [b] | 1 |
| HAF carbon black | 75 |
| MT carbon black | 75 |
| Processing oil [c] | 35 |
| Plasticizer oil [d] | 15 |
| Sulfur | 1.5 |
| 2-mercaptobenzothiazole | 1.5 |
| Thiuram disulfide | [e] |

[a] Nordel 1070; contains 1,4-hexadiene; Mooney (ML 1+4) at 250° F. of 70; specific gravity of 0.85.
[b] Antioxidant; polymerized trimethyl dihydroquinoline.
[c] Flexon 580.
[d] Plastogen.
[e] See Table 2.

The compound samples were press cured for 20 minutes at 345° F.

The following physical properties of the resulting vulcanizates were determined: modulus, tensile strength and elongation in accordance with ASTM Method D-412 and hardness in accordance with ASTM Method D-2240. The vulcanizates also were stored at room temperature for one year and examined periodically for accelerator bloom. The results are listed in Table 2.

TABLE 2

| | Vulcanizates, parts by weight | | |
|---|---|---|---|
| | A | B | C |
| Thiuram disulfide: | | | |
| Tetramethyl | 1.5 | | 0.75 |
| Tetraethyl | | 1.5 | 0.75 |
| Physical properties: | | | |
| Modulus (p.s.i.) | 1,410 | 1,320 | 1,310 |
| Tensile (p.s.i.) | 1,750 | 1,700 | 1,700 |
| Elongation (percent) | 440 | 480 | 460 |
| Hardness | 63 | 61 | 62 |
| Accelerator bloom after storage: [1] | | | |
| 1 week | M | 0 | 0 |
| 4 weeks | H | 0 | 0 |
| 2 months | H | H | 0 |
| 4 months | H | H | 0 |
| 6 months | H | H | 0 |
| 8 months | H | H | 0 |
| 10 months | H | H | 0 |
| 12 months | H | H | 0 |

[1] 0=none; L=light; M=moderate; H=heavy.

This example demonstrates that an excellent cure is obtained without accelerator bloom when a mixture of tetramethyl and tetraethyl thiuram disulfides is used whereas heavy accelerator bloom appears within a short time when either of these thiuram disulfides is used without the other.

EXAMPLE II

Vulcanizates D, E, F, G, H and I were prepared by adding various thiuram to the compounded rubber of Table E. The compounded rubbers were press cured at 345° F. for 20 minutes.

The phsyical properties of the vulcanizates therefrom were determined as described in Example I. The accelerator bloom after storage was determined visually. The results are shown in Table 3.

TABLE 3

| | Vulcanizates (parts by weight) | | | | | |
|---|---|---|---|---|---|---|
| | D | E | F | G | H | I |
| Thiuram disulfide: | | | | | | |
| Tetramethyl | 0.75 | 1.0 | | | 0.75 | 1.0 |
| Tetraethyl | | | 0.75 | 1.0 | 0.75 | 1.0 |
| Physical properties: | | | | | | |
| Modulus (p.s.i.) | 1,310 | 1,380 | 1,310 | 1,360 | 1,380 | 1,410 |
| Tensile (p.s.i.) | 1,820 | 1,810 | 1,870 | 1,790 | 1,800 | 1,760 |
| Elongation, (percent) | 520 | 460 | 520 | 500 | 480 | 480 |
| Hardness | 59 | 63 | 60 | 62 | 60 | 62 |
| Accelerator bloom after storage: | | | | | | |
| 1 week | 0 | 0 | 0 | 0 | 0 | 0 |
| 1 month | 0 | 0 | 0 | 0 | 0 | 0 |
| 2 months | 0 | 0 | 0 | 0 | 0 | 0 |
| 4 months | M | M | M | M | 0 | 0 |
| 6 months | M | M | M | M | 0 | 0 |
| 9 months | M | M | M | M | 0 | 0 |
| 12 months | M | M | M | M | 0 | 0 |
| 15 months | M | M | M | M | 0 | 0 |
| 18 months | M | M | M | M | 0 | 0 |
| 20 months | M | M | M | M | 0 | 0 |

It is evident from this example that either of the thiuram disulfide accelerators alone produces acclerator bloom after four months. However, a combination of both of the thiuram disulfides, resulting in a doubling of total thiuram disulfide present, fails to produce accelerator bloom, even after 20 months of storage.

EXAMPLE III

Various thiuram disulfides were added to the compounded rubber of Table 1. Vulcanizates J, K, L, M and N were provided after press curing for 20 minutes at 345° F.

The accelerator bloom after storage and the physical properties described in Example I were determined. Table 4 has the results of these tests.

TABLE 4

| | Vulcanizates (parts by weight) | | | | |
|---|---|---|---|---|---|
| | J | K | L | M | N |
| Thiuram disulfide: | | | | | |
|   Tetramethyl | 1.5 | 1.0 | 0.75 | 0.5 | |
|   Tetraethyl | | 0.5 | 0.75 | 1.0 | 1.5 |
| Physical properties: | | | | | |
|   Modulus (p.s.i.) | 1,460 | 1,370 | 1,360 | 1,350 | 1,370 |
|   Tensile (p.s.i.) | 1,750 | 1,690 | 1,690 | 1,720 | 1,710 |
|   Elongation (percent) | 410 | 440 | 440 | 470 | 450 |
|   Hardness | 63 | 63 | 62 | 61 | 61 |
| Accelerator bloom after storage: | | | | | |
|   1 week | L | 0 | 0 | 0 | L |
|   1 month | M | 0 | 0 | 0 | M |
|   2 months | M | 0 | 0 | 0 | M |

As shown in this example, Vulcanizates K, L and M of the invention have no accelerator bloom after storage for two months whereas control Vulcanizates J and N had accelerator bloom after storage for only one week. Furthermore, the physical properties of the vulcanizates of the invention are about the same as the physical properties of the control vulcanizates.

Having set forth the general nature and specific embodiments of the present invention, the true scope is now particularly pointed out in the appended claims.

What is claimed is:

1. A process for providing a vulcanizate which is substantially free from accelerator bloom and which has a high rate and state of cure comprising mixing 100 parts of an ethylene-propylene-diene terpolymer rubber with about 0.5 to 5.0 parts of a mixture of two different symmetrical tetraalkylthiuram disulfides having the generic structure:

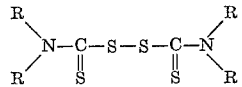

wherein each R is the same alkyl group having 1 to 6 carbon atoms, about 0.25 to 3.0 parts of a thiazole accelerator, about 0.5 to 5.0 parts of sulfur and about 1.0 to 25 parts of zinc oxide; and curing said mixture at a temperature and time sufficient to form said vulcanizate; said mixture consisting of about 30 to 70 parts of a first said disulfide and about 70 to 30 parts of a second said disulfide.

2. The process according to claim 1 in which the two disulfides are selected from the group consisting of tetramethylthiuram disulfide, tetraethylthiuram disulfide, tetrapropylthiuram disulfide and tetrabutylthiuram disulfide.

3. The process according to claim 1 in which the thiazole accelerator is 2-mercaptobenzothiazole, benzothiazolyl disulfide, N-cyclohexylbenzenethiazole-2-sulfenamide, N-dioxydiethylenebenzothiazole-2-sulfenamide, zinc 2-benzothiazolyl sulfide or mixtures thereof.

4. A vulcanizable composition for providing a vulcanizate which is substantially free from accelerator bloom and which has a high rate and state of cure comprising 100 parts of an ethylene-propylene-diene terpolymer rubber; about 0.5 to 5.0 parts of a mixture of two different symmetrical tetraalkylthiuram disulfides having the generic structure:

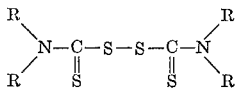

wherein each R is the same alkyl group having 1 to 6 carbon atoms, about 0.25 to 3.0 parts of a thiazole accelerator; about 0.5 to 5.0 parts of sulfur; and about 1.0 to 25 parts of zinc oxide; said mixture consisting of about 30 to 70 parts of a first said disulfide and about 70 to 30 parts of a second said disulfide.

5. The composition according to claim 4 in which the two disulfides are selected from the group consisting of tetramethylthiuram disulfide, tetraethylthiuram disulfide, tetrapropylthiuram disulfide and tetrabutylthiuram disulfide.

6. The composition according to claim 4 in which the thiazole accelerator is 2-mercaptobenzothiazole, benzothiazolyl disulfide, N - cyclohexylbenzenethiazole-2-sulfenamide, N-dioxydiethylenebenzothiazole - 2 - sulfenamide, zinc 2-benzothiazolyl sulfide or mixtures thereof.

7. A process for providing a vulcanizate which is substantially free from accelerator bloom and which has a high rate and state of cure comprising mixing 100 parts of an ethylene-propylene-diene terpolymer rubber with about 0.5 to 5.0 parts of a mixture of two different symmetrical tetraalkylthiuram disulfides consisting of about 30 to 70 parts of tetramethylthiuram disulfide and about 70 to 30 parts of tetraethylthiuram disulfide and about 0.25 to 3.0 parts of a thiazole accelerator, about 0.5 to 5.0 parts of sulfur and about 1.0 to 25 parts of zinc oxide; and curing said mixture at a temperature and time sufficient to form said vulcanizate.

8. A vulcanizable composition for providing a vulcanizate which is substantially free from accelerator bloom and which has a high rate and state of cure comprising 100 parts of an ethylene-propylene-diene terpolymer rubber; about 0.5 to 5.0 parts of a mixture of two different symmetrical tetraethylthiuram disulfides consisting of 30 to 70 parts of tetramethylthiuram disulfide and about 70 to 30 parts of tetraethylthiuram disulfide; about 0.25 to 3.0 parts of a thiazole accelerator; about 0.5 to 5.0 parts of sulfur; and about 1.0 to 25 parts of zinc oxide.

References Cited
UNITED STATES PATENTS
| | | | |
|---|---|---|---|
| 2,363,703 | 11/1944 | Sparks | 260—79.5 |
| 2,666,755 | 1/1954 | Baker | 260—79.5 |
| 3,296,183 | 1/1967 | Schoenbeck | 260—44 |

FOREIGN PATENTS
415,790    9/1934    Great Britain.

OTHER REFERENCES
Morrison, G. D., and Shepherd, T.: Transactions Inst. Rubber Industry, 22 (1946), pp. 189, 194.

JOSEPH L. SCHOFER, Primary Examiner

C. A. HENDERSON, Jr, Assistant Examiner

U.S. Cl. X.R.
260—785